United States Patent [19]

Gyenes

[11] Patent Number: 5,298,346
[45] Date of Patent: Mar. 29, 1994

[54] BATTERY IDENTIFICATION SYSTEM

[75] Inventor: Russell E. Gyenes, Sunrise, Fla.

[73] Assignee: Motorola, Inc., Schaumburg, Ill.

[21] Appl. No.: 919,667

[22] Filed: Jul. 27, 1992

[51] Int. Cl.⁵ .......................................... H01M 10/48
[52] U.S. Cl. ........................................ 429/90; 429/7
[58] Field of Search ................ 429/61, 90, 92, 93, 429/7; 356/409, 448; 359/159

[56] References Cited

U.S. PATENT DOCUMENTS

| | | | |
|---|---|---|---|
| 4,076,906 | 2/1978 | Jensen | 429/90 |
| 4,497,881 | 2/1985 | Bertolino | 429/91 |
| 4,810,872 | 3/1989 | Murakoshi et al. | 356/448 X |
| 4,828,943 | 5/1989 | Pritchard | 429/91 |
| 4,845,374 | 7/1989 | White et al. | 356/448 X |
| 4,903,340 | 2/1990 | Sorenson | 359/159 |
| 4,910,103 | 3/1990 | Yoshikawa et al. | 429/92 X |
| 4,992,340 | 2/1991 | Tidwell et al. | 429/90 X |
| 5,057,383 | 10/1991 | Sokira | 429/92 |
| 5,206,097 | 4/1993 | Burns et al. | 429/90 |

FOREIGN PATENT DOCUMENTS

57-148878  9/1982  Japan ...................... 429/90

*Primary Examiner*—Stephen Kalafut
*Attorney, Agent, or Firm*—Pablo Meles; Lesley Ann Rhyne

[57] ABSTRACT

A battery package (22) for use in a battery identification system (10) comprises a housing, at least one energy storage device (21) contained within the housing and a reflecting device (24) coupled to an external portion of the housing for reflecting electromagnetic radiation towards an electronic product (12) having a electromagnetic radiation detector (16).

18 Claims, 3 Drawing Sheets

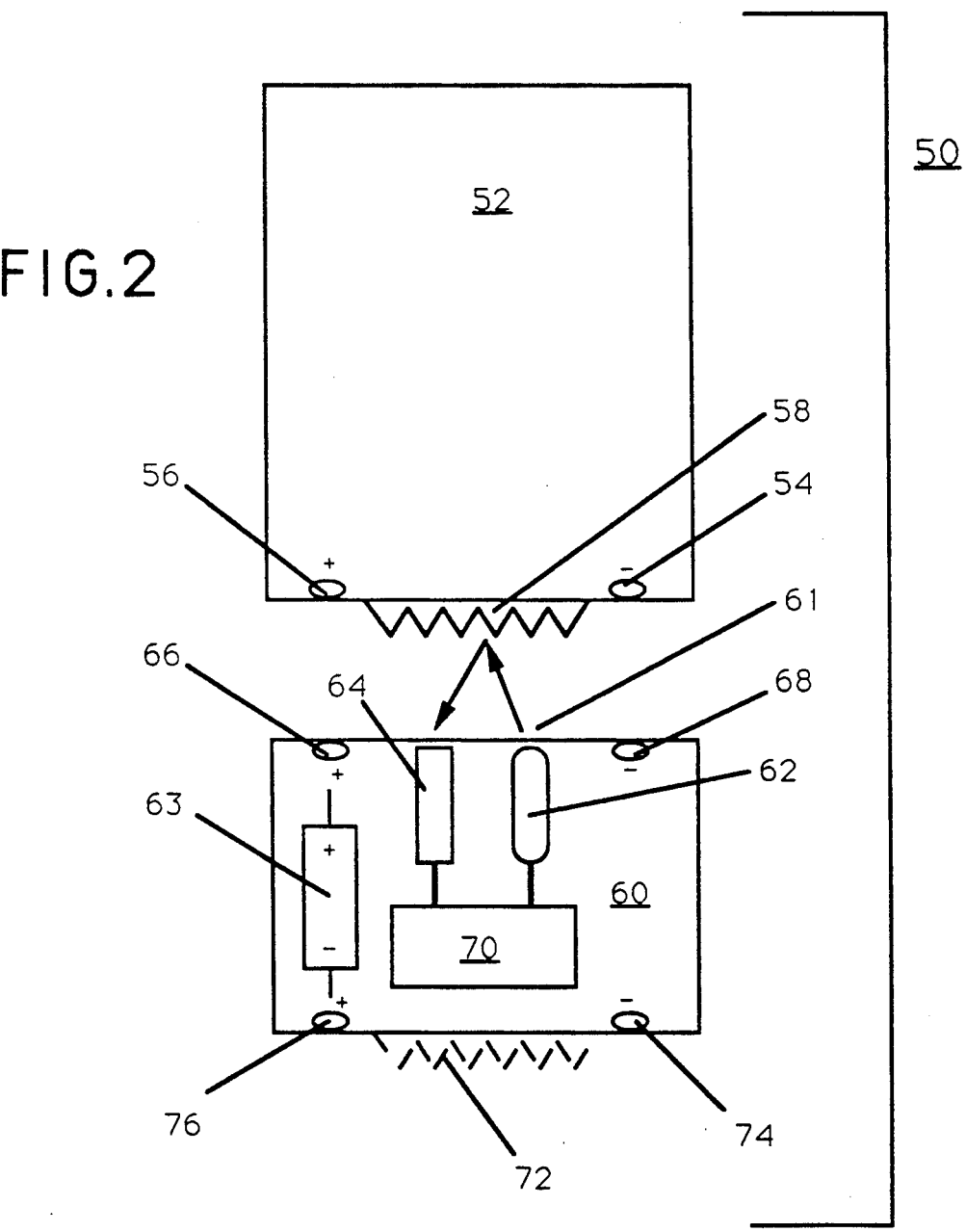

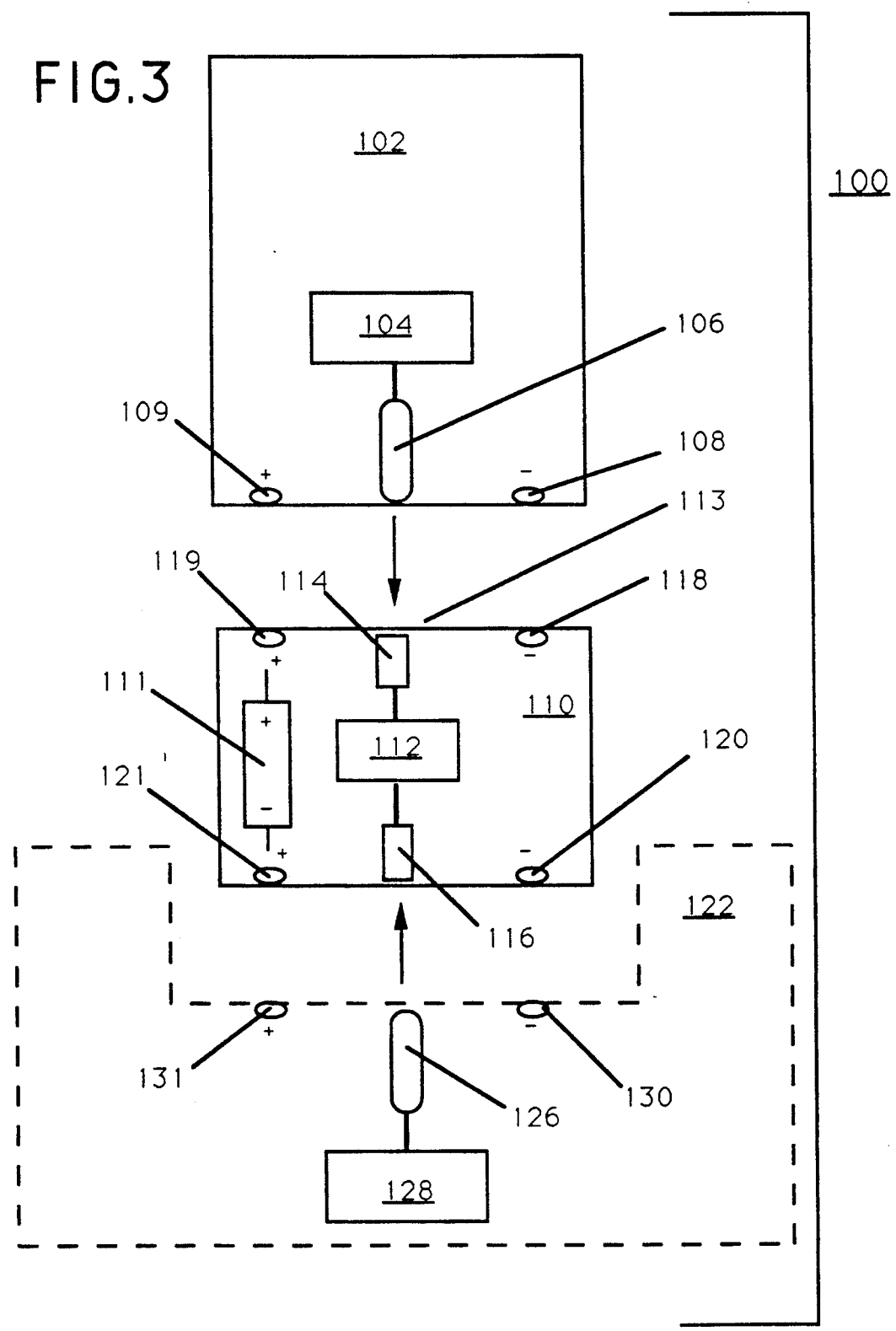

BATTERY IDENTIFICATION SYSTEM

TECHNICAL FIELD

This invention relates to batteries for portable electronic products and more particularly to a battery identification scheme using electromagnetic radiation.

BACKGROUND

Batteries or battery packs for portable electronic products come in a variety of chemistries, voltages, capacities, discharge rates and, for rechargeable batteries, a variety of charge rates as well. There are many factors that are considered in optimally charging and discharging a battery including cell temperature, external temperature, cell pressure, peak voltage, rate of change in voltage, and load requirements to name a few. These factors can typically be communicated to and from the battery and the electronic product as well as to and from the battery and charger. In some instances, the electronic product may communicate to and from the charger via the battery. Thus, a battery pack may require several contacts to communicate these factors between the battery and the electronic product or charger. Typically, the more information required, the greater number of contacts required. Additional contacts will increase the manufacturing cost of a battery pack and reduce its water sealing integrity. Therefore, a need exists for a battery pack that will provide all of the desired information to an electronic product such as a radio or a charger and that will not further reduce its water sealing integrity.

SUMMARY OF THE INVENTION

A battery package for use in a battery identification system comprises a housing, at least one energy storage device contained within the housing and a reflecting device coupled to an external portion of the housing for reflecting electromagnetic radiation towards an electronic product having a electromagnetic radiation detector.

In an alternative embodiment of the present invention, a battery pack used in a battery identification system comprises a housing having a substantially transparent area, at least one cell within the housing and a detector positioned within the transparent area for detecting electromagnetic waves.

BRIEF DESCRIPTION OF THE DRAWINGS

FIG. 2 is a block diagram of an alternative battery package identification system in accordance with the present invention.

FIG. 3 is a block diagram of another alternative battery package identification system in accordance with the present invention.

DETAILED DESCRIPTION OF THE PREFERRED EMBODIMENT

Figure 1:
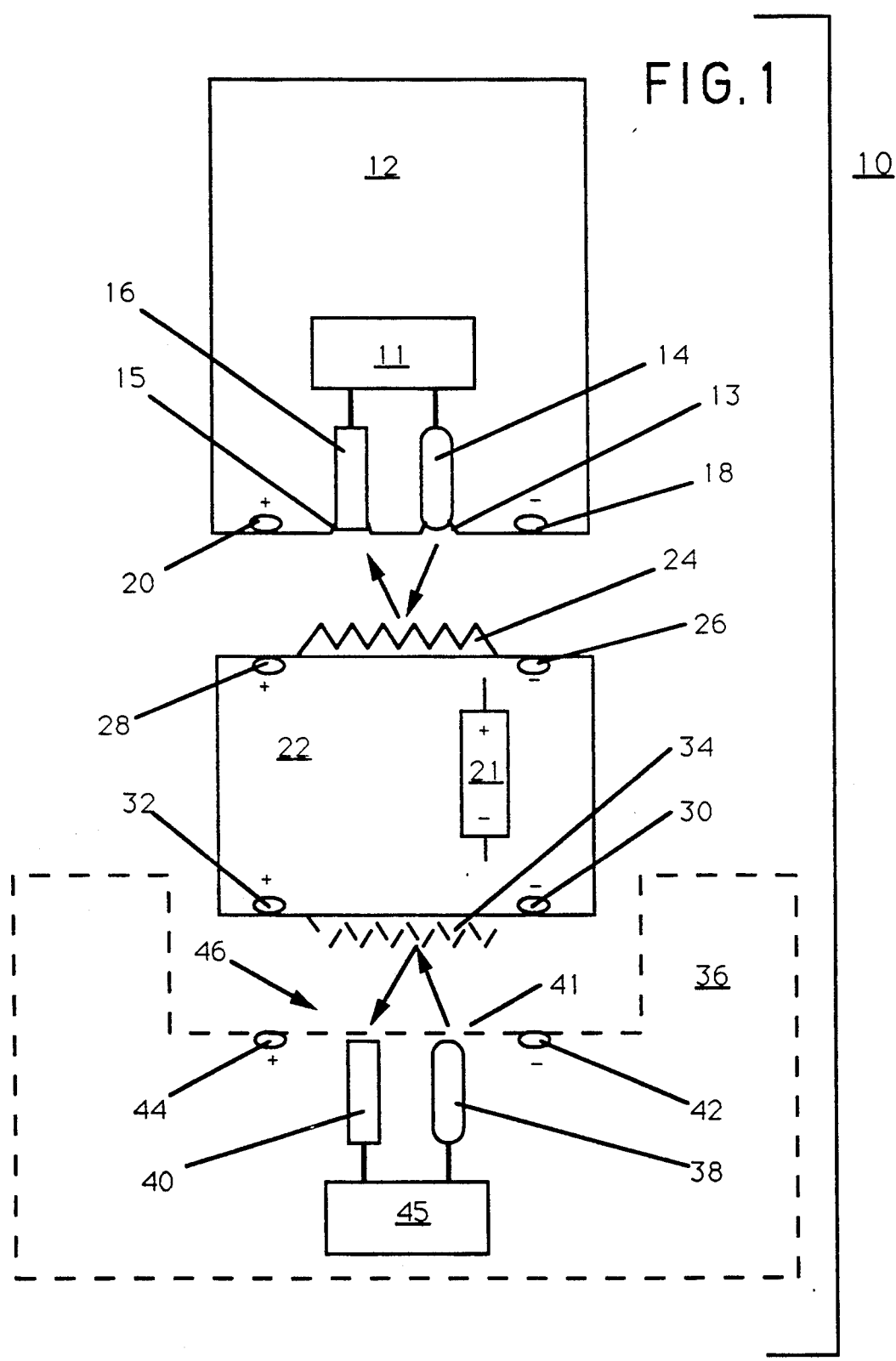
FIG. 1 is a block diagram of a battery package identification system in accordance with the present invention.

Referring to FIG. 1, a battery identification system 10 is shown having a battery 22, a charger 36, and an electronic device 12 such as a two-way radio. The system 10 is ideally applicable for use with portable electronic products using rechargeable batteries such as nickel cadmium, nickel metal hydride, or lithium for example. The battery pack 22 typically comprises of an energy storage means 21, such as battery cells coupled in series or parallel and encased in a housing. Additionally, the battery pack 22 comprises power contacts 26 and 28 for providing power to the radio 12 via radio contacts 18 and 20 respectively on the radio 12 and charger contacts 30 and 32 for connection to the corresponding contacts 42 and 44 respectively on the charger 36. The battery pack 22 finally comprises at least one reflective means or reflector 24 for reflecting electromagnetic radiation towards the radio 12. The electromagnetic waves are preferably generated by an electromagnetic wave generator 14 and detected by a detecting means 16 both housed within the radio housing. A non-contact communication may be made between the battery 22 and the electronic product 12. This eliminates the need for additional electrical contacts and difficult-to-seal contacts in the housings. The generator may be a simple light emitting diode and the detector means could be a photo detector, both preferably controlled by a microprocessor 11. The radio 12 has either apertures or transparent areas 13 and 15 to allow the light to emit from aperture or transparent area 13 and to allow the detector to detect such light via area 15.

Optionally, the battery pack 22 has an additional reflective surface 34 serving a similar purpose as reflector 24. The charger 36 comprises of a battery pack receiving area 46 wherein the battery charger contacts 42 and 44 would couple with charger contacts 30 and 32 respectively on the battery pack 22. The charger, again, would optionally include an electromagnetic wave generator 38 such as a light emitting diode (LED) and a detector 40 such as a photo detector, both preferably controlled by a microprocessor 45. The LED and detector would preferably lie within the charger housing behind a substantially transparent surface 41 such as clear plastic or Plexiglass. The charger 36 could then identify the type of battery being inserted into the charger and provide the appropriate or optimum charging current to the battery via contacts 42 and 44. The manner in which the charger identifies the battery would be similar to the manner in which the radio identifies the battery as explained below.

Operationally, the LED 14 would pulse or emit a infrared or light signal. Other types of light signals may be used that operate outside the visible spectrum, for example, infrared transmitters and sensors or ultraviolet transmitters and sensors. In this instance, the radio would need to be coupled to the battery to power the LED initially. Optionally, the LED could be powered by a separate smaller battery within the radio 12 such as a button cell (not shown). The detector would sense either the existence of the signal or the wavelength that is reflected from the reflector 24 on the battery 22. The reflected wavelength or the location of the reflected signal or the mere existence of a signal would provide some information to the radio. If desired, particular wavelengths of reflected light could indicate different battery parameters or identify a particular battery model. Examples of battery parameters that may be communicated to the radio are: battery voltage, battery type, battery capacity, the battery cell chemistry, and other identifying information. Therefore, a reflector could be designed to reflect a particular wavelength of light and thereby indicate a particular battery having a given characteristic. Regardless, the radio or charger could be programmed to be inoperative if their respective detectors do not detect a reflected electromagnetic wave signal. In this manner, batteries that are inappropriate or hazardous for the electronic product's function are not discharged or charged.

The advantage (besides increased water sealing) of using the above methodology in a battery-radio interface or a battery charger interface is that the microprocessor necessary to manipulate the data and convert it into a useful signal is placed in the radio. Typically, this microprocessor already exists in radios or chargers and thus simply requires additional programming to monitor and convert these signals into useful information. By utilizing the radio microprocessor 11 and charger microprocessor 45, an additional microprocessor is not needed in the battery. This is very important because each portable radio and charger may have several types of batteries that are used from time to time. By utilizing the microprocessor in the radio and/or charger, the manufacturing cost and complexity of the battery is reduced significantly.

Referring to FIG. 2, there is shown an alternative battery pack identification system 50 in accordance with the present invention. Here, the battery pack 60 comprises of a battery pack housing having a substantially transparent surface area 61. Within the housing, resides a an energy storage means 63, an electromagnetic wave generator means 62 and a detector means 64, both preferably coupled to a microprocessor 70. Additionally the battery pack 60 comprises power contacts 66 and 68 for providing power to the radio 52 via radio contacts 56 and 54 respectively on the radio 52 and charger contacts 74 and 76 for connection to corresponding contacts on a charger such as charger 36 in FIG. 1. The battery pack 60 preferably couples to an electronic device 52 such as a two-way radio having a reflective means 58 on the radio-battery interface area. Although this embodiment includes a microprocessor in the battery pack, the declining costs of microprocessors may some day allow this embodiment to be cost effective.

Operationally, the battery 60 powers the electromagnetic wave generator means 62 which provides a signal or which would identify the radio to the battery by reflecting the generated signal from the reflector means 58 to the photo detector 64 in the battery. In this manner, the battery could optimally adjust (using the microprocessor 70) the current and voltage levels provided to the radio 52. Optionally, an additional reflector 72 can provide the same battery identification functions provided by battery 22 (of FIG. 1) to a charger such as charger 36.

Referring to FIG. 3, there is shown another alternative battery pack identification system 100 in accordance with the present invention. Here, the battery pack 110 comprises of a battery pack housing having a substantially transparent surface area 113. Within the housing, resides a an energy storage means 111 and a detector means 114 preferably coupled to a microprocessor 112. Additionally the battery pack 110 comprises power contacts 118 and 119 for providing power to the radio 102 via radio contacts 108 and 109 respectively on the radio 102 and charger contacts 121 and 120 for connection to corresponding contacts 131 and 130 respectively on a charger 122. The battery pack 110 preferably couples to an electronic device 102 such as a two-way radio having an electromagnetic wave generator means 106 preferably coupled to a microprocessor 104. Optionally, the battery 110 has another detector 116 preferably coupled to the microprocessor 112 for detecting electromagnetic radiation from another electronic product such as the charger 122. The charger 122 would preferably include an electromagnetic wave generator means 126 such as an LED which is coupled to the microprocessor 128.

Operationally, the system 100 uses the detectors (114 & 116) in the battery 110 to determine whether the correct battery is attached to the corresponding electronic products (radio 102 and charger 122) and further whether the appropriate charge is being provided to the battery or whether the optimum voltage and current is being provided to the radio. For example, a two-way radio typically has three different load requirements depending on its function: transmit, receive, and standby. The LED 106 could pulsate at different frequencies to indicate which operating mode the radio is in. In this way, the battery could regulate (using a switching regulator or other type of regulator (not shown) within the battery) the current or voltage being provided to the electronic product 102. Likewise, the LED 126 in charger 122 could pulsate at different frequencies to indicate to the battery that the charge to the battery should be regulated or terminated depending on certain factors. For instance, depending on the type of cell chemistry the battery pack 22 has, the charger could have an external temperature sensor (not shown) that would be a factor in changing in the charging algorithm to the battery. In this manner, a noncontact communication may be made between the battery charger 122 and the battery pack 110.

What is claimed is:

1. A battery package identification system, comprising:
    an electronic device having an electromagnetic wave generator for generating electromagnetic waves and a detecting means for detecting electromagnetic waves; and
    a battery package for attachment to the electronic device having a reflecting means for directing the electromagnetic waves from the electromagnetic wave generator to the detecting means.

2. The battery identification system of claim 1, wherein said reflecting means comprises a reflector mounted on a portion of the battery package housing for reflecting electromagnetic waves toward a photo detecting device within the electronic device.

3. The battery identification system of claim 1, wherein said battery package comprises battery cells.

4. The battery identification system of claim 1, wherein said battery identification system further comprises:
    in a housing for the electronic device having at least a substantially transparent area:
        a photo detector for detecting electromagnetic waves, said detector positioned within said substantially transparent area;
        an electromagnetic wave generator within said electronic device, said wave generator providing a signal reflected by the means and detectable by said photo detector.

5. The battery identification system of claim 4, wherein said electromagnetic wave generator comprises a light emitter.

6. The battery identification system of claim 2, wherein said electronic device comprises a portable radio.

7. The battery identification system of claim 2, wherein said electronic device comprises a battery charger.

8. The battery identification system of claim 4, wherein said photo detector and said electromagnetic wave generator are coupled to a microprocessor.

9. A battery pack used in a battery identification system, comprising:
- a housing having a substantially transparent area;
- at least one cell within the housing;
- a detector means positioned within said transparent area for detecting electromagnetic waves.

10. The battery pack of claim 9, wherein said detector means is coupled to a microprocessor.

11. A battery pack of claim 9 wherein said battery identification device further comprises:
- a housing for a portable electronic product, wherein said battery pack couples to said electronic product;
- an electromagnetic wave generating means within said electronic product, said wave generating means providing a signal detectable by said detector means.

12. The battery pack of claim 9, wherein said detector means comprises a photo detector.

13. The battery pack of claim 11, wherein said electromagnetic wave generating means comprises a light emitting diode.

14. A battery pack in a battery identification system, comprising:
- a housing having at least a substantially transparent area;
- at least one cell within said housing;
- an electromagnetic wave generator positioned within said substantially transparent area;
- a photo detector positioned within said substantially transparent area for detecting reflected electromagnetic waves generated by said electromagnetic wave generator and reflected towards said photo detector.

15. The battery pack of claim 14, wherein said photo detector is coupled to a microprocessor.

16. The battery pack of claim 14, wherein said battery identification system further comprises a processing means coupled to said electromagnetic wave generator and said photo detector.

17. The battery pack of claim 14, wherein said battery identification system further comprises a reflector on an electronic product for reflecting electromagnetic waves provided by the electromagnetic wave generator toward the photo detector with the battery pack.

18. The battery pack of claim 14, wherein said battery identification system further comprises a reflector on the housing of the battery pack.

* * * * *